United States Patent [19]

Rücker et al.

[11] 4,398,730
[45] Aug. 16, 1983

[54] ROTARY RING SEAL WITH GAS-DYNAMIC LUBRICATION FOR HIGH-SPEED TURBOMACHINES

[75] Inventors: Gerhard Rücker, Karlsfeld; Wilfried Weidmann, Munich; Karl-Ullrich Reisenweber, Unterschleissheim, all of Fed. Rep. of Germany

[73] Assignee: MTU Motoren-und Turbinen-Union Munchen GmbH, Fed. Rep. of Germany

[21] Appl. No.: 376,228

[22] Filed: May 7, 1982

[30] Foreign Application Priority Data

May 15, 1981 [DE] Fed. Rep. of Germany ....... 3119467

[51] Int. Cl.³ .............................................. F16J 15/34
[52] U.S. Cl. .................................. 277/96.1; 277/22; 277/215
[58] Field of Search .................... 277/22, 96, 96.1, 215

[56] References Cited

U.S. PATENT DOCUMENTS

| | | | |
|---|---|---|---|
| 2,858,149 | 10/1958 | Laser | 277/96.1 |
| 3,383,116 | 5/1968 | Carter | 277/96.1 |
| 3,610,639 | 10/1971 | Staats | 277/215 |
| 4,305,592 | 12/1981 | Peterson | 277/22 |

*Primary Examiner*—Robert I. Smith
*Attorney, Agent, or Firm*—Scully, Scott, Murphy & Presser

[57] ABSTRACT

A rotary ring seal with gas-dynamic lubrication for high-speed turbomachines, particularly gas turbine engines, in which one of two complementary rings is radially perforated with apertures which extend in parallel with the ring sealing face and which are supplied with a cooling liquid. In order to achieve a durable seal, particularly with regard to high temperatures and speeds, a circumferentially periodically uniformly increasing and decreasing number of holes extending through the mating ring provide for the generation of a periodically alternating temperature and, consequently, an axial-expansion zone of the ring so as to produce a periodically uniformly undulated sliding surface on the mating ring which corresponds to the lubricant wedge profile of a gas-dynamic thrust bearing.

6 Claims, 4 Drawing Figures

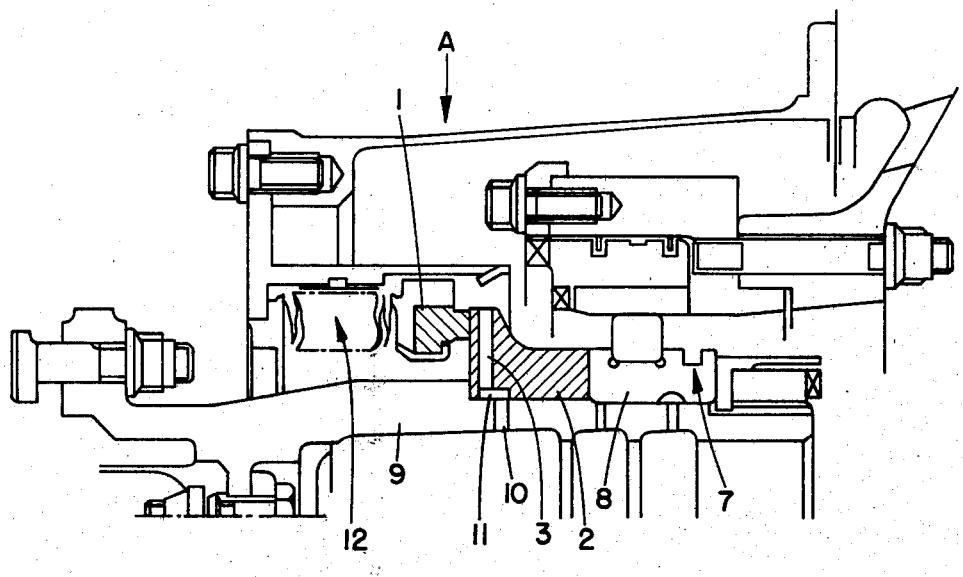
FIG. 1
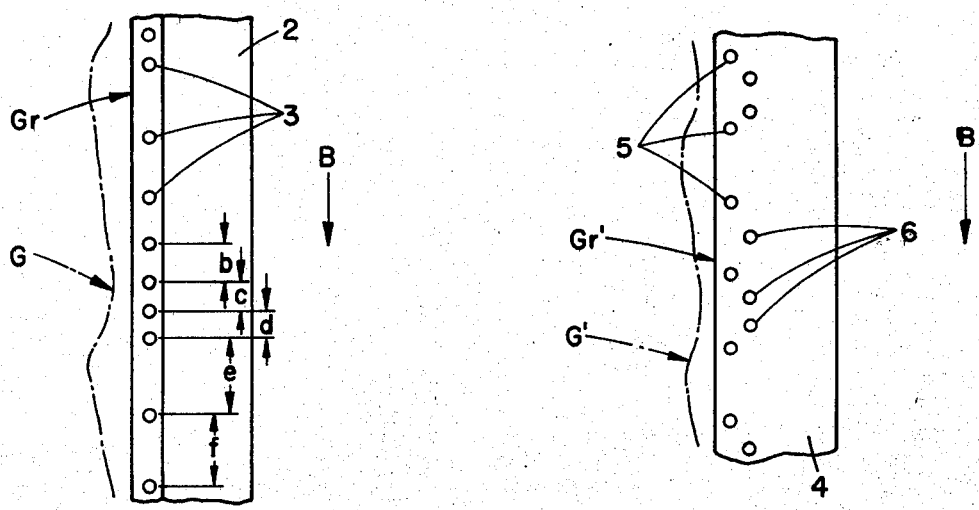
FIG. 2
FIG. 3
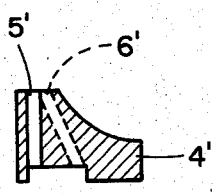
FIG. 4

ROTARY RING SEAL WITH GAS-DYNAMIC LUBRICATION FOR HIGH-SPEED TURBOMACHINES

BACKGROUND OF THE INVENTION

1. Field of the Invention

The present invention relates to a rotary ring seal with gasdynamic lubrication for high-speed turbomachines, particularly gas turbine engines, in which one of two complementary mating rings is radially traversed by apertures which extend in parallel with the ring sealing face and which are supplied with a cooling liquid.

High-speed rotary ring seals, rotating at sliding speeds of about 130 m/sec and higher, for obvious reasons the two sliding surfaces should not be allowed to remain in contact with each other over periods substantially exceeding the starting up and shutdown times, because of the danger of possible wear, heat generation and with the consequent destruction of the sealing and sliding surface.

2. Discussion of the Prior Art

Heretofore, for separating the surfaces, the following methods have been employed:

(a) Introduction of oil or other suitable hydraulic materials for separation (lubrication) of the surfaces, with, if required, subsequent evaporation, or (b) Generation of gas or air cushions in an aerostatic or gas-dynamic manner.

The first of the above-mentioned methods, particularly where the media which are to be sealed off are gaseous, threaten to contaminate the media with the lubricating (separating) material and, where environmental or media temperatures are high, to cause carbonization of the lubricant. This method is, therefore, preferably suitable for the sealing of media which are also hydraulic (medium is equivalent to separating and lubricating medium).

The second method is adapted for the sealing off of gaseous materials, particularly wherein a gas cushion is generated gas-dynamaically.

A procedure which comes under the second-mentioned method contemplates the formation of, for example, riser surfaces, or socalled "lift pads", for the generation of the gas-dynamic lubricating wedge.

This method requires a considerable complexity in manufacture. Moreover, the thusly obtained lift pads are subjected to a relatively high degree of wear, which necessitates complicated remachining and, at times, extensive repairs.

SUMMARY OF THE INVENTION

Accordingly, it is a primary object of the present invention to eliminate the disadvantages encountered in the above-mentioned methods and to provide a high-speed, high-temperature rotary seal which is simple to manufacture, and which is concurrently distinguished through extremely low wear and a correspondingly reduced requirement for servicing and repair.

BRIEF DESCRIPTION OF THE DRAWINGS

Reference may now be had to the following detailed description of preferred embodiments of the invention, taken in conjunction with the accompanying drawings, in which:

FIG. 1 is a sectional axial view illustrating a turbomachine shaft bearing incorporating the rotary seal pursuant to the present invention;

FIG. 2 shows a view, in direction A in FIG. 1, of the mating ring associated with the rotary seal, illustrating the profile of the sliding surface resulting at room and at operating temperatures;

FIG. 3 illustrates a modified embodiment of the mating ring in FIGS. 1 and 2 in the direction A in FIG. 1; and FIG. 4 is a sectional view illustrating a further embodiment of the mating ring shown in FIGS. 1, 2 and 3.

DETAILED DESCRIPTION

Referring to FIG. 1 of the drawings, the rotary seal for a high-speed turbomachine, especially a gas turbine engine, consists of two cooperating rings, in essence, a seal ring 1 and a mating ring 2. The bores 3 which are arranged in the mating ring 2 extend in parallel with the applicable ring sealing face and, furthermore, are supplied with a cooling liquid, for instance, oil.

The invention is basically distinguished by a periodically uniformly increasing and again decreasing number of bores 3 in the circumferential direction for each circumferential angle of the mating ring 2 (FIG. 2). As a result of the ensuing periodically alternating temperature and, as a consequence, the axial expansion zone of the mating ring 2, a periodically uniformly undulated sliding surface G is formed on the ring at operating temperature, whereby this sliding surface G should approximately correspond to the "lubricant wedge profile" of a gas-dynamic axial thrust bearing. The sliding surface which is present at room temperature is indicated by $G_r$.

With respect to this undulated sliding surface G, it is assumed that the heat generated during the sliding of the mating ring 2 on the seal ring 1 (or possibly also introduced by any present sealing medium) is dissipated in a more intense degree in zones of more closely spaced bore holes, for instance, b,c,d, and to a lesser degree in zones of more widely spaces bore holes, such as e,f.

This wave contour of the sliding surface G corresponds to the desired shape of the so called "lubricant wedge formation" of a gas-dynamic axial thrust bearing, and is generated, particularly in accordance with FIG. 2, by means of a periodically uniformly increasing and again decreasing number of bore holes 3 in the mating ring 2 arranged in successive alignment in a common radial plane.

For the purposes which have been previously elucidated in detail in connection with FIGS. 1 and 2, the mating ring 4 purusant to FIG. 3 incorporates rows of first 5 and second 6 holes arranged in two parallel radial planes, of which the first holes 5 are circumferentially equally spaced at the side facing towards the sliding surface, whereas the second holes 6 are arranged in a periodically uniformly alternating circumferential spacing to generate, in combination with the first holes 5, a periodically uniformly undulating sliding surface G' at operating temperature. In FIG. 3, the sliding surface which is present at room temperature is indicated by $G_r'$. Assuming, as a prerequisite, generally equal basic operating factors (temperature/speed), the embodiment of FIG. 3, in comparison with that of FIG. 2, facilitates a more closely spaced wave sequence of the sliding surface G' over the entire circumference of the mating ring surface, in that the arrangement of bore holes in two radial planes will permit the attainment of a more closely spaced sequence of bore holes.

FIG. 4 illustrates still another embodiment of the mating ring 4', in which the bore holes 6' are disposed at an angle relative to the radially or vertically extending holes 5' of the first row of holes.

In the implementation of the present invention, it is basically assumed that the sliding surfaces of the seal ring and of the mating ring are in sliding contact with each other in a dry condition. However, it is readily possible that in lieu of the gaseous sealing medium there can be introduced a fluidic sealing medium between the corresponding annular sliding surfaces of the seal and its mating ring.

As is illustrated in greater detail in FIG. 1, in this instance the mating ring 2, which is arranged for example, adjacent to or on the inner race 8 of the bearing 7, is seated on a tubular cylindrical machine shaft 9, from which the respective bore holes 3 of the mating ring 2 are supplied with a cooling liquid, such as oil, which is initially conveyed through radial bore holes 10 in the wall of the machine shaft into an annulus 11 formed between the wall of the shaft and the mating ring 2; and with the annulus communicating with the remaining bore holes 3 for the differential cooling of the mating ring.

The piston ring-like retained seal ring 1 is axially flexibly supported on stationary casing components through the intermediary of a bellows 12. The axially flexible support can, however, also be attained by means of a spring or through the use of a diaphragm which is responsive to the respective pressure conditions.

The present invention can be advantageously utilized with stationary gas turbine systems, as well as with turbojet engines and turbochargers.

While there has been shown and described what is considered to be a preferred embodiment of the invention, it should be understood that modification in form and detail can be made without departing from the spirit or essence of the invention. It is therefore intended that the invention be not limited to the exact form and detail herein shown and described nor to anything less than the whole of the invention as hereinafter claimed.

What is claimed is:

1. In a rotary seal with gas-dynamic lubrication for high-speed turbomachines, particularly gas turbine engines, including two cooperating rings, one of said cooperating rings being a mating ring radially perforated with bore holes extending in parallel with the ring sealing face and supplied with a cooling liquid, the improvement comprising in that a circumferentially periodically uniformly increasing and decreasing number of said bore holes in said mating ring generate a periodically alternating temperature and an axial expansion zone on the ring so as to produce a periodically uniformly undulated sliding surface on the mating ring which conforms with the lubricant wedge profile of a gas-dynamic bearing.

2. Rotary seal as claimed in claim 1, wherein said periodically uniformly increasing and decreasing bore holes in the mating ring are sequentially aligned in a common radial plane.

3. Rotary seal as claimed in claim 1, wherein said mating ring includes rows of first and second of said bore holes arranged in two parallel radial planes, the row of first bore holes being circumferentially equally spaced on the side facing towards the sliding surface, the row of second bore holes being arranged in periodically uniformly alternating circumferential spacing so as to in conjunction with the row of first bore holes produce a periodically uniformly undulated sliding surface.

4. Rotary seal as claimed in claim 1, wherein said mating ring includes a row of first bore holes arranged in a radial or vertical plane and a row of second bore holes arranged at an angle relative to the radial or vertical plane of the row of first bore holes, the row of first bore holes being circumferentially equally spaced on the side facing towards the sliding face, the row of second bore holes being arranged in periodically uniformly alternating circumferential spacing so as to in conjunction with the row of first bore holes produce a periodically uniformly undulating sliding surface.

5. Rotary seal as claimed in claim 1, wherein the sliding surfaces of the seal and of the mating ring are in sliding contact with each other in the dry condition thereof.

6. Rotary seal as claimed in claim 1, wherein a fluidic sealing liquid is introduced between the cooperating sliding surfaces of the seal and the mating ring.

* * * * *